US010292089B2

(12) United States Patent
Peters et al.

(10) Patent No.: US 10,292,089 B2
(45) Date of Patent: May 14, 2019

(54) RE-ESTABLISHING CONNECTIVITY ON LOST PLAYERS

(71) Applicant: Sonos, Inc., Santa Barbara, CA (US)

(72) Inventors: Jeffrey Peters, Leominster, MA (US); Hrishikesh Gossain, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 50 days.

(21) Appl. No.: 15/707,730

(22) Filed: Sep. 18, 2017

(65) Prior Publication Data

US 2019/0090176 A1    Mar. 21, 2019

(51) Int. Cl.
| | |
|---|---|
| *H04W 48/10* | (2009.01) |
| *H04L 12/24* | (2006.01) |
| *H04W 76/40* | (2018.01) |
| *H04L 29/12* | (2006.01) |
| *H04W 84/12* | (2009.01) |

(52) U.S. Cl.
CPC ......... *H04W 48/10* (2013.01); *H04L 41/0859* (2013.01); *H04W 76/40* (2018.02); *H04L 61/2007* (2013.01); *H04L 61/2038* (2013.01); *H04W 84/12* (2013.01)

(58) Field of Classification Search
CPC .... H04W 48/10; H04W 76/40; H04L 41/0859
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |
| 5,923,902 | A | 7/1999 | Inagaki |
| 6,032,202 | A | 2/2000 | Lea et al. |
| 6,256,554 | B1 | 7/2001 | Dilorenzo |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.

(Continued)

*Primary Examiner* — Siming Liu
(74) *Attorney, Agent, or Firm* — McDonnell Boehnen Hulbert & Berghoff LLP

(57) ABSTRACT

An example implementation may involve a first playback device accessing, from a file, first network parameters. The first playback device determines that it is unable to establish a valid network connection to the first WLAN using the first network parameters. In response, the first playback device broadcasts a probe request message. The first playback device receives, from a second playback device, a response to the probe request message, the response to the probe request message indicating second network parameters that are assigned to a network interface of the second playback device. The first playback device establishes a valid network connection to the particular WLAN using the second network parameters and joins, via the established network connection to the particular WLAN, a media playback system that comprises the second playback device.

20 Claims, 9 Drawing Sheets

(56) References Cited

U.S. PATENT DOCUMENTS

| | | |
|---|---|---|
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne |
| 8,942,252 B2 | 1/2015 | Balassanian et al. |
| 9,191,699 B2 * | 11/2015 | Agerbak .......... H04N 21/43615 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |

OTHER PUBLICATIONS

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

* cited by examiner

RE-ESTABLISHING CONNECTIVITY ON LOST PLAYERS

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
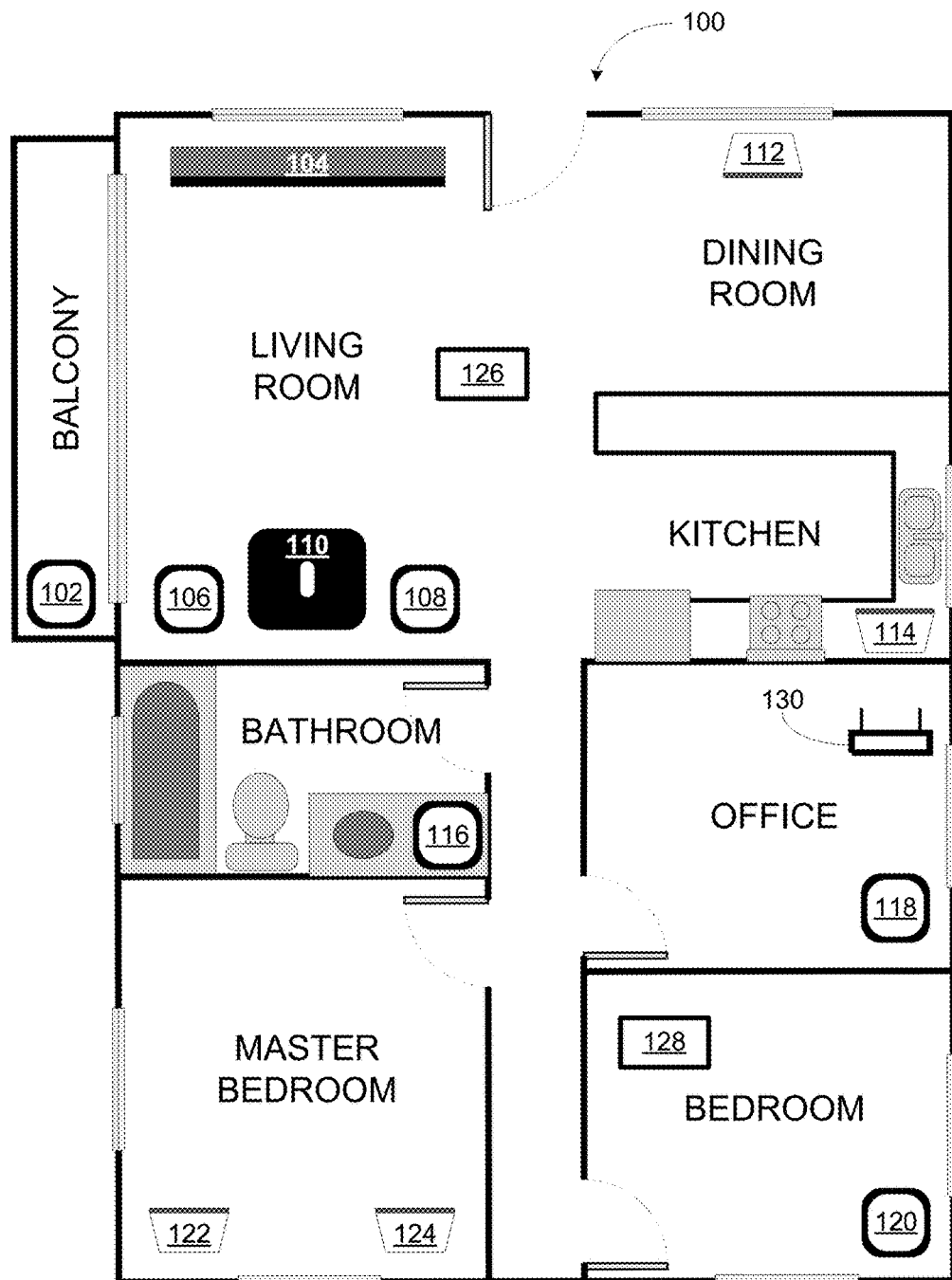
FIG. 1 shows an example media playback system configuration in which certain implementations may be practiced.

The drawings are for the purpose of illustrating example embodiments, but it is understood that the inventions are not limited to the arrangements and instrumentality shown in the drawings.

DETAILED DESCRIPTION

I. Overview

Example implementations described herein involve, inter alia, techniques to re-establish network connectivity of a playback device to a media playback system when the playback device is in a "lost" state. Example media playback systems include multiple network-interconnected devices (e.g., one or more playback devices to play back media and/or one or more control devices to control playback by the one or more playback devices). To promote network stability, playback devices of such example media playback systems may store network parameters in a file in data storage and utilize these parameters to establish a network connection.

However, utilizing network parameters in a stored file creates a potential for those parameters to become "stale" (i.e., different) from the current network parameters in use by the network. A playback device of a media playback system may enter a "lost" state when the playback device cannot establish a connection to the media playback system because its stored network parameters are "stale." For example, while a given playback device of a media playback system is powered down, the media playback system may change the wireless channel for its network. When the playback device is powered back up and attempts to establish a connected using its stored network parameters, the playback device will be unable to establish a network connection because the playback device is attempting to use the previous wireless channel.

In contrast to the example playback devices described above, other network client devices obtain network parameters dynamically from a router or gateway (e.g., a Dynamic Host Configuration Protocol (DHCP)) server). Initially, such a client device may obtain network parameters via a discovery process. After a power-cycle, the client device may re-obtain the network parameters from the router or gateway. In such an example, since the client device isn't using network parameters stored in a file in data storage, the network parameters do not become stale and the client device avoids getting lost. However, because the network parameters are obtained dynamically, certain parameters (like the client IP address) are not as stable as when a client device (e.g., a playback device) utilizes network parameters that are stored in a file on the client device. As an example of less stability, the client device might obtain a different IP address when re-obtaining the network parameters from the router or gateway.

In some example techniques, a first playback device of a media playback device may re-establish network connectivity by obtaining network parameters from a second playback device of the media playback system. In an example, the first playback device determines that the first playback device is in a "lost" state, i.e., that the first playback device has lost its connection to the network. As a result, the first playback device searches for a second playback device that is not in the "lost" state, i.e., that the second playback device has a valid network connection. The first playback device may search for the second playback device by broadcasting a probe message. In response to receiving such a probe message, a second playback device may send a response message back to the first playback device. The response message (and/or one or more subsequent message from the second playback device) includes data representing network parameters utilized by the second playback device. Upon receiving such network parameters, the first playback device adopts the network parameters represented in the received message(s) to re-establish network connectivity.

As indicated above, example media playback systems may include one or more control devices to control playback by the one or more playback devices. Such control devices may control the playback device(s) by transmitting commands over a network via a network interface. As such, when a playback device becomes "lost" (i.e., loses network connectivity), the control devices may have limited (or no) ability to control the playback device. Moreover, in some implementations, the playback devices themselves have a limited control interface. For instance, an example playback device may include transport controls (e.g., play/pause, skip) and volume controls but exclude a touch-screen display or other control interface suitable for establishing (or re-establishing) a network connection. As such, example techniques described herein may facilitate such a playback device re-establishing network connectivity without user input by obtaining network parameters from another playback device when the playback device detects that it has become "lost."

Further, in some implementations, each network parameters file on a respective playback device has a respective version number, which may facilitate a playback device utilizing the most recent network parameters available. For instance, after temporarily re-establishing network connectivity using network parameters from a second playback device, a first playback device may determine the most recent network parameters of the media playback system. To determine the most recent network parameters of the media playback system, the first playback device may receive network parameters (and corresponding version numbers) from multiple playback devices within the network.

Given that each playback device increments the version number of its respective network parameters file when updating the network parameters stored in that file, the first playback device may determine the most recent parameters by identifying the network parameters having the most recent version number. If the first playback device finds more up-to-date network parameters, the first playback device updates its network parameters file and utilizes those network parameters. The first playback device may also replicate these network parameters to other playback devices within the media playback system, to facilitate each playback device having the most recent parameters.

As noted above, example techniques may involve re-establishing network connectivity of a playback device to a media playback system. A first implementation may include accessing, from a file stored in data storage of the first playback device, first network parameters comprising: (i) a service set identifier (SSID) identifying a first wireless local area network (WLAN); (ii) a wireless channel; (iii) an IP address for the network interface, wherein the first playback device previously established a valid network connection over the first WLAN using the first network parameters. The first implementation may also include determining that the first playback device is unable to establish a valid network connection to the first WLAN using the first network parameters, wherein determining that the first playback device is unable to establish a valid network connection to the first WLAN comprises attempting to connect to the first WLAN via the wireless network interface using the first network parameter, and in response to determining that the first playback device is unable to establish the valid network connection to the first WLAN, broadcasting, via the network interface, a probe request message over multiple wireless channels. The first implementation may further include receiving, via the wireless network interface from a second playback device, a response to the probe request message, the response to the probe request message indicating second network parameters that are assigned to a network interface of the second playback device to establish a valid network connection to a particular WLAN, wherein the particular WLAN is one of: (a) the first WLAN or (b) a second WLAN, and wherein the second wireless parameters comprise a wireless channel of the particular WLAN. The first implementation may include establishing, via the wireless network interface, a valid network connection to the particular WLAN using the second network parameters; and joining, via the established valid network connection to the particular WLAN, a media playback system that comprises the second playback device, wherein the first playback device is configured to play back audio content using the established valid connection to the particular WLAN.

A second implementation may involve a first playback device connected via a wired connection to an access point and a second playback device configured to connect to the access point via a wireless point-to-point connection to the first playback device. The second implementation may include determining that the second playback device is unable to establish a valid network connection to the access point via the wireless point-to-point connection to the first playback device using first network parameters, and in response to determining that the second playback device is unable to establish the valid network connection to the access point, broadcasting, via a network interface of the second playback device, a probe request message over multiple wireless channels. The second implementation may also include receiving, via the wireless network interface from the first playback device, a response to the probe request message, the response to the probe request message indicating second network parameters assigned to a network interface of the first playback device, wherein the second network parameters are different from the first network parameters. The second implementation may further include establishing, via the wireless network interface, a valid network connection to the access point via the wireless point-to-point connection to the first playback device using the second network parameters.

A third implementation may involve a first playback device connected via a wired connection to a first access point that is configured to assign IP addresses in a first subnet; a second playback device connected via a wired connection to a network device, wherein the network device is not an access point; and a third playback device configured to connect to the first access point via a wireless point-to-point connection to the first playback device. The third implementation may include determining that the first access point has been replaced with a second access point, wherein the second access point is configured to assign IP addresses in a second subnet that covers a different IP address range than the first subnet, and in response to determining that the first access point has been replaced with the second access point, connecting, via a network interface of the third playback device, to the second access point. The third implementation may further include after connecting to the second access point, requesting, via the network interface of the third playback device, an IP address in the second subnet. The third implementation may also include establishing, via the network interface of the third playback device, a network connection to the second access point via a wireless point-to-point connection to the first playback device using the IP address in the second subnet.

Each of the these example implementations may be embodied as a method, a device configured to carry out the implementation, a system of devices configured to carry out the implementation, or a non-transitory computer-readable medium containing instructions that are executable by one or more processors to carry out the implementation, among other examples. It will be understood by one of ordinary skill in the art that this disclosure includes numerous other embodiments, including combinations of the example features described herein. Further, any example operation described as being performed by a given device to illustrate a technique may be performed by any suitable devices, including the devices described herein. Yet further, any device may cause another device to perform any of the operations described herein.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

Some operations are described herein as being performed "in response to" another operation. For purposes of this disclosure, an operation performed "in response to" another operation is intended to describe an operation performed as a necessary result of the other operation. However, an operation performed "in response to" another operation need not necessarily be performed immediately following the other operation. For instance, a device may perform a first operation, then perform one or more second operations, and then perform a third operation in response to the third operation. Moreover, an given operation performed in response to a certain operation may also be performed based on other operations, but the given operation is intended to be a necessary result of the certain operation.

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
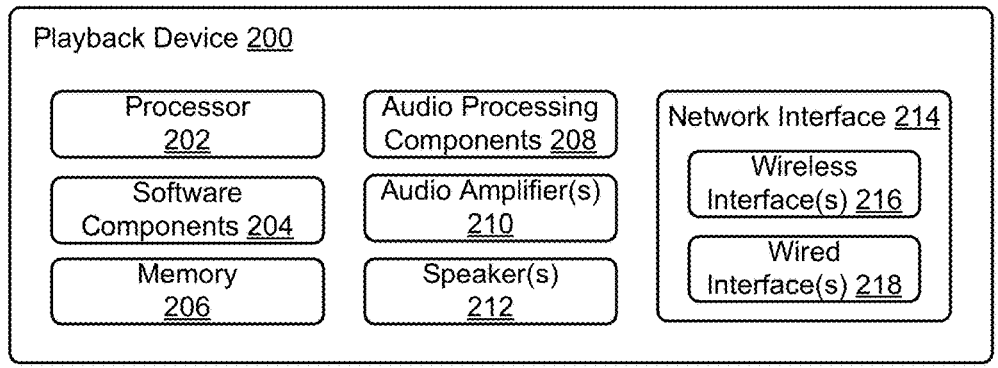
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
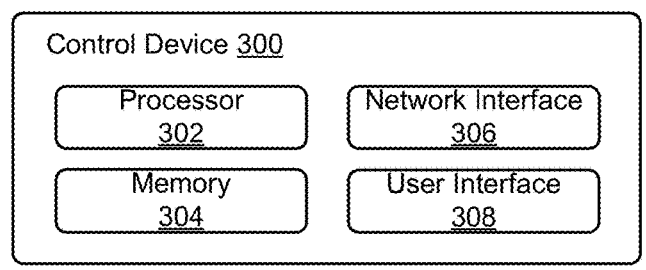
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
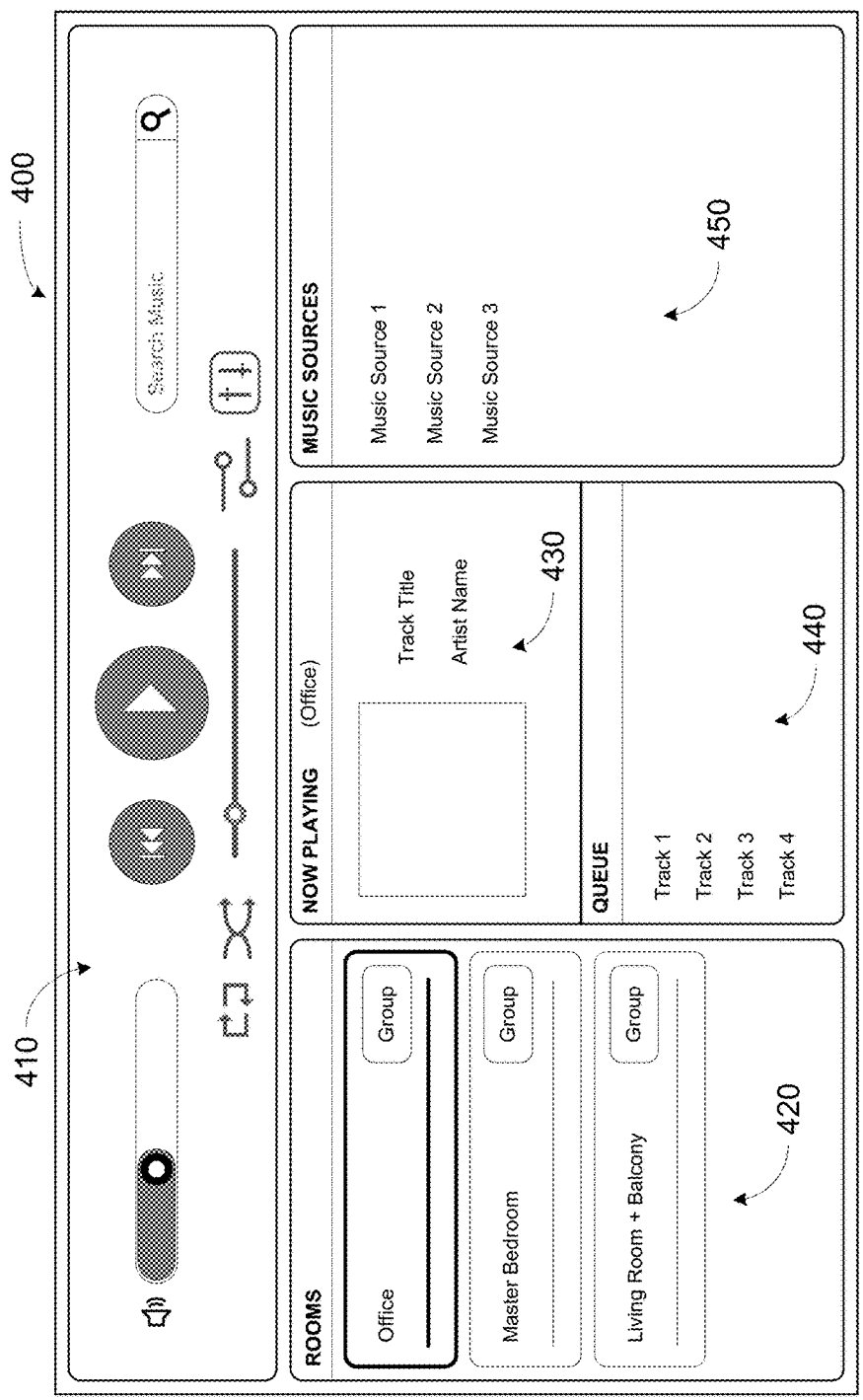
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400A are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400A.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400A of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

Figure 5:
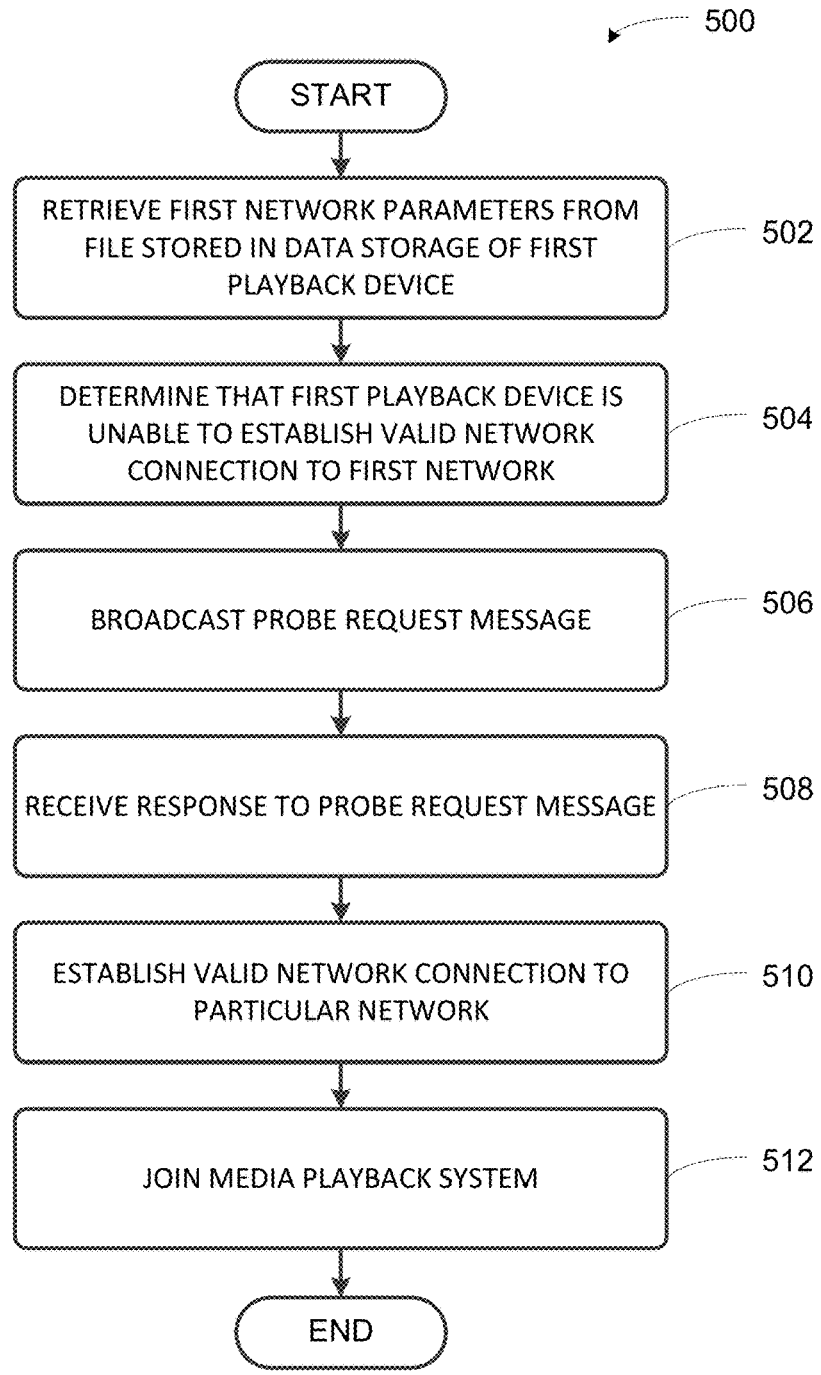
FIG. 5 shows an example flow diagram to re-establish network connectivity of a playback device.

FIG. 5 depicts a smartphone 500 that includes one or more processors, a tangible computer-readable memory, a network interface, and a display. Smartphone 500 might be an example implementation of control device 126 or 128 of FIG. 1, or control device 300 of FIG. 3, or other control devices described herein. By way of example, reference will be made to smartphone 500 and certain control interfaces, prompts, and other graphical elements that smartphone 500 may display when operating as a control device of a media playback system (e.g., of media playback system 100). Within examples, such interfaces and elements may be displayed by any suitable control device, such as a smartphone, tablet computer, laptop or desktop computer, personal media player, or a remote control device.

While operating as a control device of a media playback system, smartphone 500 may display one or more controller interface, such as controller interface 400. Similar to playback control region 410, playback zone region 420, playback status region 430, playback queue region 440, and/or audio content sources region 450 of FIG. 4, smartphone 500 might display one or more respective interfaces, such as a playback control interface, a playback zone interface, a playback status interface, a playback queue interface, and/or an audio content sources interface. Example control devices might display separate interfaces (rather than regions) where screen size is relatively limited, such as with smartphones or other handheld devices.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

Figure 8:
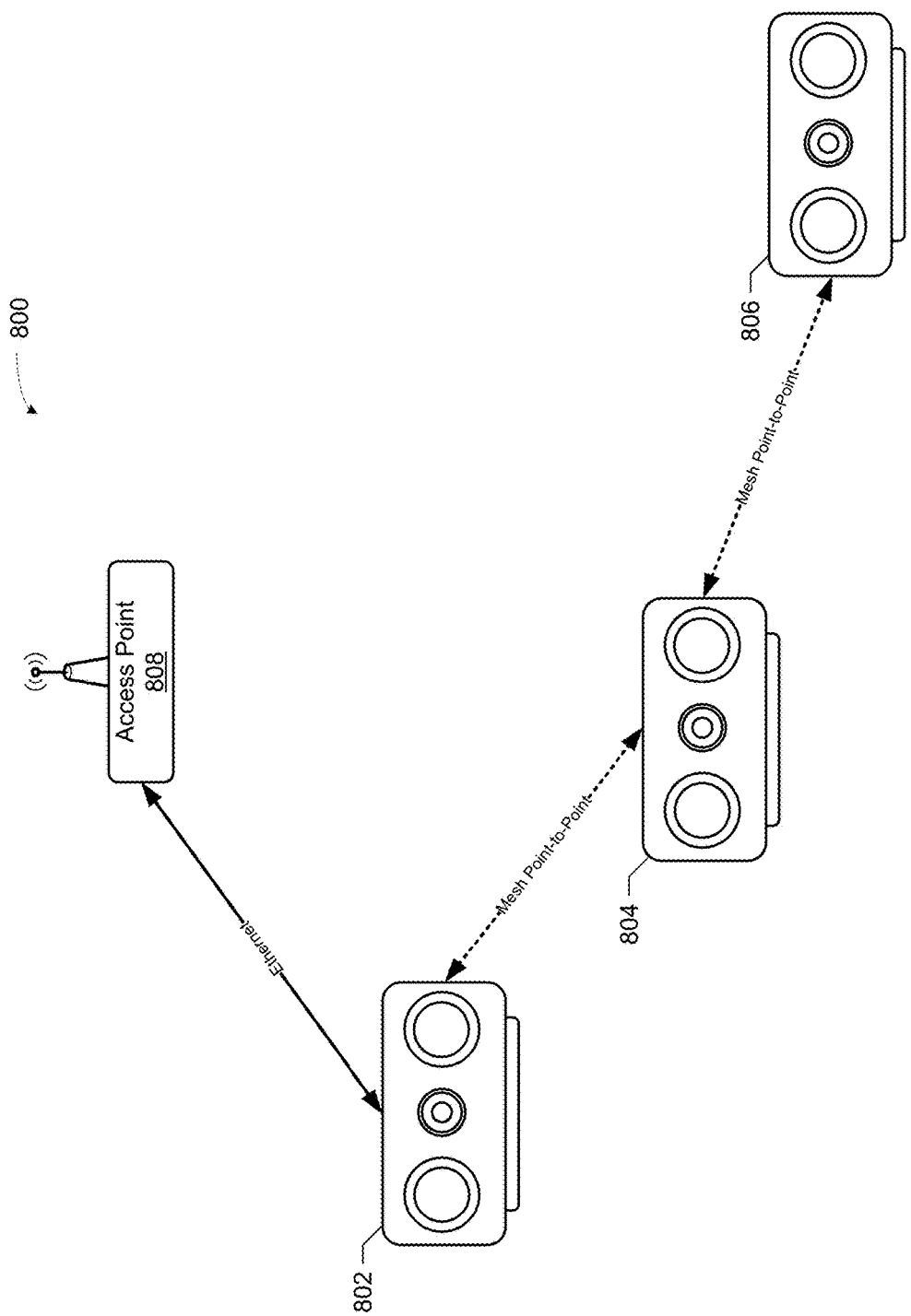
FIG. 8 shows another example system in which example implementations may be practiced.
Figure 10:
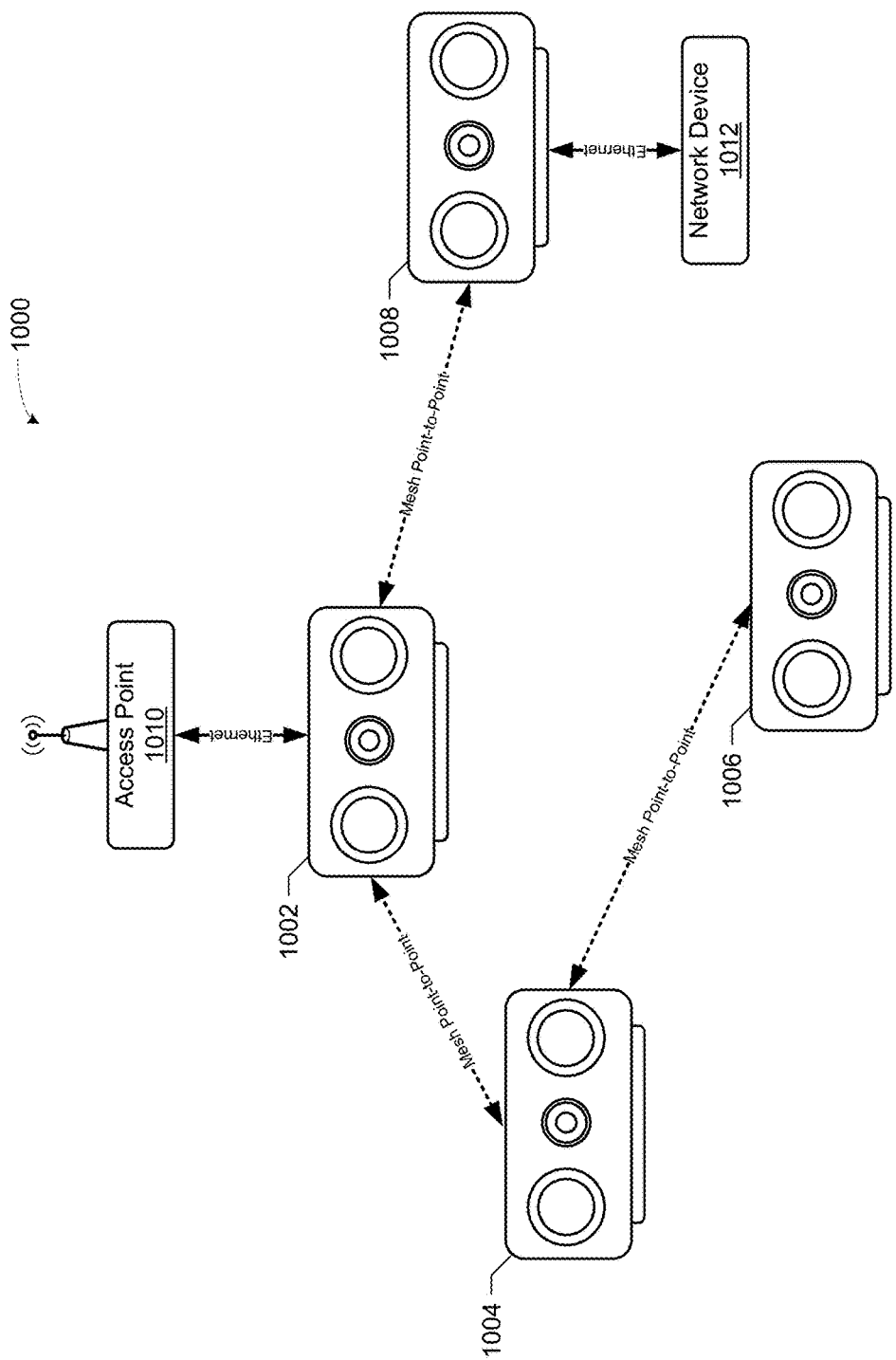
FIG. 10 shows an example system in which example implementations may be practiced.

Moving now to several example implementations, implementations 500, 800, and 1000 shown in FIGS. 5, 8, and 10, respectively present example embodiments of techniques described herein. These example embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementations 500, 800, and 1000 may include one or more operations, functions, or actions as illustrated by one or more of blocks shown in FIGS. 5, 8 and 10. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

IV. Example Techniques to Re-Establish Connectivity of a Playback Device

As indicated above, some example techniques may involve a playback device re-establishing network connectivity. FIG. 5 presents an implementation 500 to facilitate a first playback device establishing network connectivity using network parameters of a second playback device a. Accessing First Network Parameters from File Stored in Data Storage of First Playback Device At block 502, implementation 500 involves accessing first network parameters from a file stored in data storage of a first playback device. For instance, a first playback device (e.g., any playback device shown in FIG. 1 or playback device 200 of FIG. 2) may retrieve, from a file stored in data storage of the first playback device (e.g., memory 206), first network parameters. The first playback device may retrieve the first network parameters by performing a read operation on the file stored in data storage, so as to retrieve the first network parameters from characters, symbols, or other data structures representing the first network parameters.

The first network parameters stored in the file include network settings that the first playback device previously used to establish a valid network connection to a first local area network (e.g., a first wireless local area network (WLAN)). In other words, at least at a previous point-in-time, the network parameters stored in the file represented settings that, when used with a network interface of the first playback device, enabled the first playback device to establish a valid network connection to the first local area network. However, when the first playback device retrieves the first network parameters, changes external to the first playback device (e.g., changes to the first local area network), may have caused the first network parameters to become "stale," such that the first playback device is no longer able to establish a valid network connection to the first local area network using the first network parameters.

The file may include various network parameters sufficient to establish a network connection to a local area network. For instance, the network parameters may include an IP address for the first playback device, as well as a gateway address. For a wireless local area network, the network parameters may include a service set identifier (SSID) that identifies the first wireless local area network and a wireless channel (e.g., a wireless channel on the 2.4 GHz or 5 Ghz bands). If the network is secured using a protocol such as Wi-Fi Protected Access (WPA), the network parameters may also include wireless security settings, such as a security key. Other example network parameters include a media access control (MAC) address and a subnet mask. In some implementations, the file may include an address for a DHCP server, a subnet mask, and DHCP lease information (e.g., when a lease was obtained from the DHCP server and/or when the lease expires). Other network parameters could be stored in the file as well.

As indicated above, example first playback devices establish a network connection to perform operations such as receiving control commands from a control device (e.g., control device 300) or to retrieve media content for playback. As such, in preparation for such operations, the first playback device may access the first network parameters as part of a power-on or boot-up sequence after a power cycle. After accessing the first network parameters (perhaps in response to accessing the first network parameters), the first playback device may attempt to establish a network connection using those first network parameters.

Figure 6:
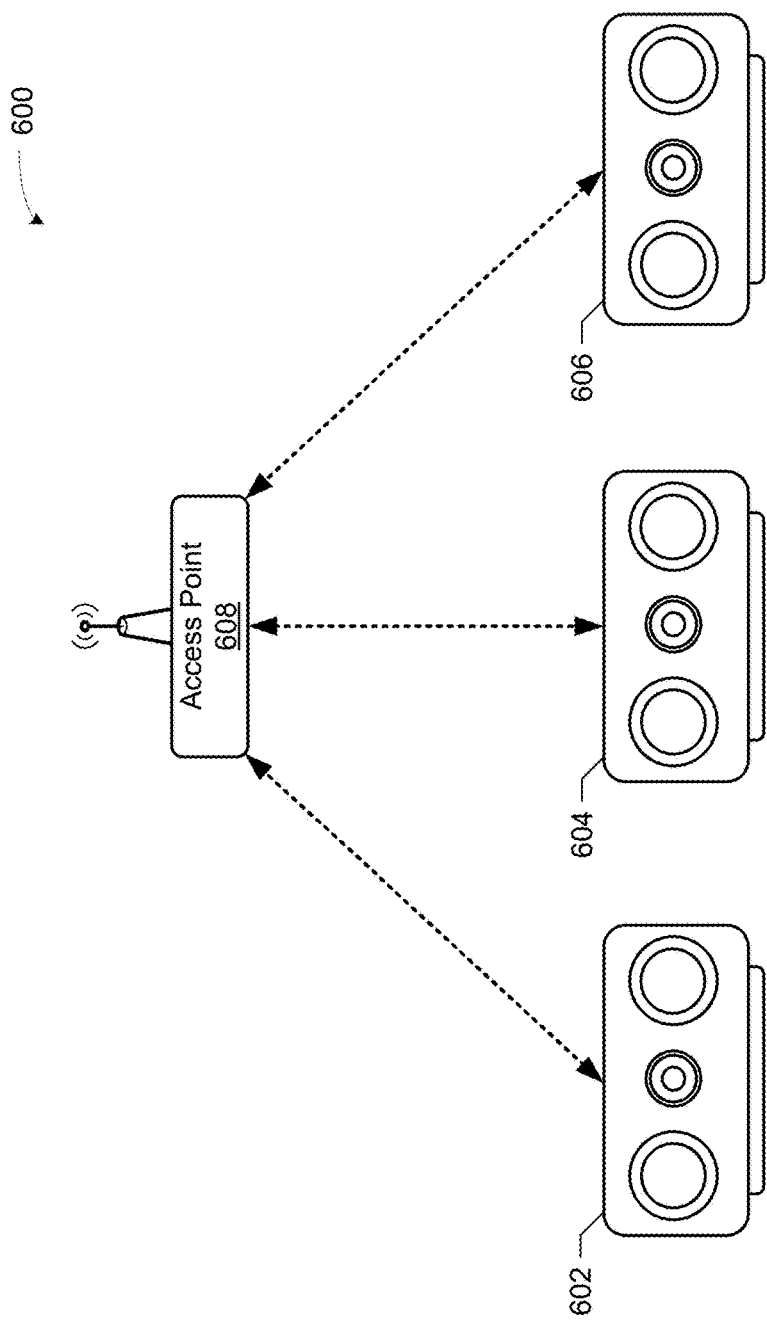
FIG. 6 shows an example system in which example implementations may be practiced.

FIG. 6 illustrates an example system 600 in which implementation 500 (as well as other implementations described herein) may be practiced. As shown, system 600 includes playback device 602, playback device 604, and playback device 606. Playback device 602, playback device 604, and playback device 606 may represent playback devices of a media playback system that are interconnected via a local area network provided by access point 608. Other devices not shown in FIG. 6 may also be connected to a local area network provided by access point 608. Such devices may include control devices, additional playback devices, and other types of network client devices.

As shown in FIG. 6, system 600 also includes an access point 608 that facilitates a local area network. In some examples, access point 608 provides a first local area network in an infrastructure (station) mode in which client devices communicate with one another through the access point. Alternatively, access point 608 represents a node in a point-to-point mesh network. In such a network, one or more other nodes may be connected to the mesh network via the access point 608. Other examples are possible as well.

In an example, playback device 604 may access, from a file stored in data storage of playback device 604, first network parameters. Such first network parameters may include any of the example network parameters described above, as well as any other suitable network parameters. For instance, the first network parameters may include network parameters for a first wireless local area network, such as a SSID, wireless channel, and an IP address for the playback device 604. The first playback device may retrieve additional network parameters from the file as well.

b. Determine that First Playback Device is Unable to Establish Valid Network Connection to First Local Area Network Referring back to FIG. 5, at block 504, implementation 500 involves determining that the first playback device is unable to establish a valid network connection to the first local area network. For instance, the first playback device may determine whether the first playback device is able to establish a valid network connection to the first local area network in response to accessing the first network parameters from the file. As noted above, in some cases, the first network parameters will have become stale. In such circumstances, the first playback device may determine that the first playback device is unable to establish a valid network connection to the first local area network.

Determining that the first playback device is unable to establish the valid network connection to the first local area network may involve attempting to connect to the first local area network using the first network parameters retrieved from the file in data storage. To reduce the likelihood of a false-positive determination, the first playback device may repeatedly attempt to connect to the first local area network. A threshold number of failed attempts may cause the first playback device to determine that the first playback device is unable to establish a valid network connection. In some implementations, the first playback device may make repeated attempts to connect over a significant window of time (e.g., a window that is longer than 30 seconds, such as a 60-120 second window, among other examples). Repeated attempts to connect over such a window of time reduce the likelihood of a false-positive determination that the first playback device is unable to establish a valid network connection.

The first playback device may determine that it has established a "valid" network connection under any of a number of different conditions. For instance, the first playback device may determine whether it has established a network connection in station mode to an access point of the first local area network. The first playback device may also determine whether it has established a network path to a wired network connection through a point-to-point mesh network using an IP address assigned by an access point (i.e., not a default or auto-assigned IP address, which might not be indicative of a valid network connection). The first playback device may further determine whether it has established a network connection to a control device. A first playback device may establish a point-to-point network connection with a control device as part of a set-up procedure. In making such a connection, the playback device may utilize a default or auto-assigned IP address. If the first playback device is unable to establish a network connection under any of these conditions, then the first playback device may determine that it is unable to establish a "valid" network connection.

Referring back to FIG. 6, in the example noted above, playback device 604 may determine whether playback device 604 is able to establish a network connection to the first wireless local area network using the first network parameters retrieved from a file stored in data storage of playback device 604. For instance, playback device 604 may attempt to connect to establish a valid network connection with access point 608. If playback device 604 is unable to establish a network connection (perhaps after repeated attempts over a window of time), then playback device 604 may determine that it is unable to establish a network connection to the first wireless local area network using the first network parameters.

c. Broadcast a Probe Request Message

In FIG. 5, at block 506, implementation 500 involves broadcasting a probe request message. For example, the first playback device may broadcast a probe request message over multiple wireless channels via a network interface (e.g., an IEEE 802.11 compatible wireless network interface). In some implementations, the first playback device broadcasts the probe request message in response to determining that the first playback device is unable to establish the valid network connection to the first local area network.

The first playback device broadcasts a probe request message in an attempt to reach one or more second playback devices of the same media playback system as the first playback devices. Such second playback devices may be configured (e.g., programmed) to listen for probe request messages via respective network interfaces, and in response to receiving a probe request message, send a response to the sender (i.e., the first playback device). Ultimately, the response may include second network parameters in use by a second playback device to establish a valid network connection to a particular local area network.

To increase the likelihood of the probe request message being received by one or more second playback devices, broadcasting the probe request message may involve broadcasting the probe request over multiple wireless channels. For instance, the first playback device may broadcast the probe request message over the allowed channels in one or more frequency bands (e.g., channels 1-11 in the 2.4 Ghz band). Allowed channels and bands may vary by country and/or jurisdiction.

The probe request message may include various indications that provide information about the first playback device to second playback devices that receive the probe request message. For instance, the probe request message may include an indication of the first playback device (e.g., an address of the first playback device). The probe request message may also include an indication that the first playback device is lost. Such an indication may take the form of a certain sequence of characters or a flag that can be set to indicate whether the broadcasting device is lost (e.g., a '1' if lost and a '0' if not lost). The probe request message may also include a destination address (i.e., a broadcast address, such as in an IPv4 network, the 255.255.255.255 address).

For instance, the probe request message may also include an indication of the media playback system to which the first playback system belongs. Example media playback systems described herein may each have an assigned household ID (HHID) that distinguishes a given media playback system (a "household") from other media playback systems. Other types of identifiers may distinguish playback devices within a media playback system, such as zone names, IP addresses, player IDs, or MAC addresses, among other examples. An example media playback system may include one or more playback devices, but the system is has a single HHID that identifies the system as a whole, whether it include one playback device or multiple playback devices. The probe request message may include an indication of a household ID (HHID) of the media playback system to which the first playback device belongs.

In some implementations, the probe request message may include (or consist of) a probe request frame. A probe request frame is a particular type of message defined in the 802.11 specification to scan an area for existing 802.11 networks. The probe request frame may include various information elements that provide information about the first playback device to second playback devices that receive the probe request message. Such information elements may include the various indications described above, such as an indication that the first playback device is lost and an indication of the media playback system to which the first playback system belongs, among others.

Figure 7A:
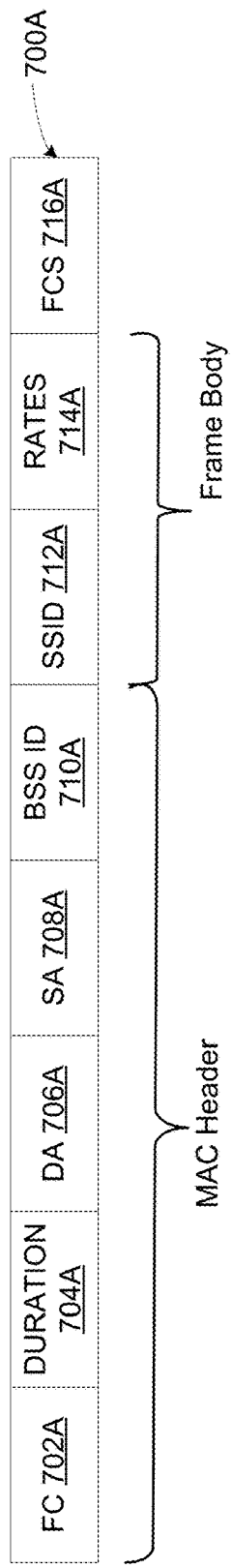
FIGS. 7A and 7B shows example messages to facilitate re-establishing network connectivity of a playback device.

To illustrate, FIG. 7A depicts an example probe request frame 700A, which the first playback device may broadcast in response to determining that it is unable to establish a valid connection. Probe request frame 700A may conform to a specification, such as the IEEE 802.11 specification. While probe request frame 700A may conform to a specification, probe request frame 700A may also be modified for certain implementations. For instance, example probe request frames may include additional fields, or the fields of an IEEE 802.11 probe request frame may be re-purposed for this implementation.

As shown, within the MAC header, probe request frame 700A includes a frame control 702A, which may indicate the type of frame. Probe request frame 700A also includes a duration 704A, which for broadcast or multicast frames is set to 0. Probe request frame 700A further includes a destination address (DA) 706A and source address (SA) 708A, which indicate the destination (e.g., the all 'f's broadcast address) and the source (e.g., the first playback device) of the probe request frame 700A, respectively. Probe request frame 700A further includes a basic service set (BSS) ID 710A. In the probe request message, the BSS ID may be set to the broadcast BSS ID (e.g., the all 1-s BSSID). Frames that use the broadcast BSSID pass through any BSSID filtering, which allows probe request messages to reach any BSS in wireless range.

Within the frame body, probe request frame 700A also includes a service set ID (SSID) 712A and supported rates 714A. Stations (e.g., second playback devices) that receive probe requests use this information to determine whether the transmitting device (e.g., the first playback device) can join the network. The SSID 712A may be set to the SSID of a specific network or set to join any compatible network. This field may be set to the HHID of the media playback system to which the first playback device belongs. If the first playback device is able to join multiple media playback systems, this field may include a list of HHIDs. In some implementations, the SSID of a wireless network of interconnecting devices of a media playback system may also serve as the HHID of the media playback system. Alternatively, this can be set to the broadcast SSID, which indicates that the first playback device is allowed to join any network. The probe request frame 700A also includes rates 714A, which indicates the rates supported by the first playback device. The probe request frame 700A further includes frame check sequence (FCS) 716A, which is an error-detecting code added to the frame.

Referring back to FIG. 6, in the example introduced above, playback device 604 may broadcast a probe request message in response to determining that it is unable to establish a valid network connection using the first network parameters retrieved from the file in data storage. The broadcasted probe request message may indicate that playback device 604 belongs to a particular media playback system (e.g., a media playback system also including playback device 602 and/or 606 and having a specific HHID). The broadcasted probe request message may further indicate that playback device 604 is lost. Other indications are possible as well, as noted above d. Receive Response to Probe Request Message Referring again to FIG. 5, at block 508, implementation 500 involves receiving a response to the probe request message. For example, the first playback device may receive a response to the probe request message via the network interface from a second playback device. The response to the probe request message indicates second network parameters.

Such second network parameters are network settings in use by the second playback device to establish a valid network connection to a particular local area network. In some cases, this local area network may be the first local area network to which the first playback device was previously connected using the first network parameters stored in the file. However, certain of the parameters may have changed (e.g., the wireless channel) which caused the first network parameters to become stale. Alternatively, the second network parameters may indicate network settings in use by the second playback device to connect to a second local area network. For instance, the first playback device may have been moved between two households (e.g., between a user's primary residence and vacation home). The two households may be associated with different HHIDs. The first and second local area networks may be networks at the primary residence and vacation home, respectively (or vice versa).

As indicated above, a second playback device that receives the probe request message may send a response to the received probe request message if certain conditions are met. A first condition may be that the second playback device is part of the same media playback system (household) as the first playback device. As noted above, the first playback device may indicate its household in the probe request message. Another condition may be that the second playback device has a valid network connection. In response to receiving the probe request message, a second playback device may determine whether it meets the appropriate conditions, and if so, transmit a response message to the probe request message.

In some cases, multiple second playback devices may receive the probe request message and determine that the appropriate conditions for response are met. As such, in some cases, the first playback device may receive multiple response messages. A second playback device in the household of the first playback device which does not have a valid network connection will either not respond to the probe request message or send a response without second network parameters, among various implementations. The second playback device(s) may send such response(s) to the source address indicated in the probe request message (e.g., the address indicated in the SA 708A field).

In some implementations, the probe request message may include (or consist of) a probe request frame. A probe request frame is a particular type of message defined in the 802.11 specification to scan an area for existing 802.11 networks. The probe request frame may include various information elements that provide information about the first playback device to second playback devices that receive the probe request message. Such information elements may include the various indications described above, such as an indication that the first playback device is lost and an indication of the media playback system to which the first playback system belongs, among others.

Figure 7B:
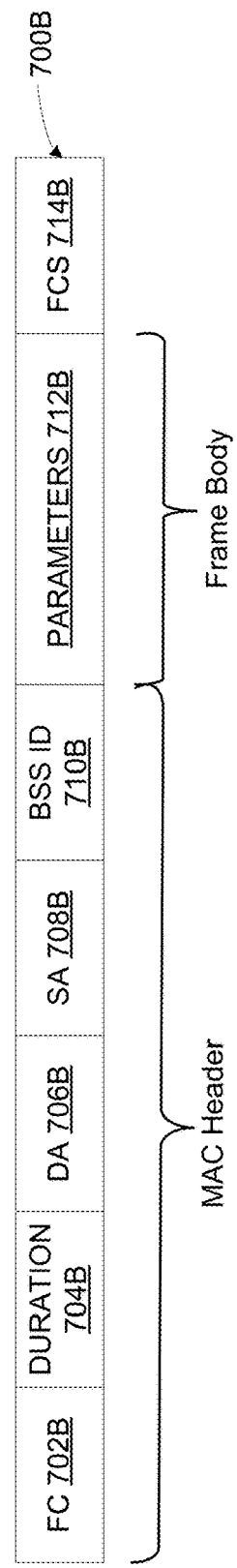

To illustrate, FIG. 7B depicts an example probe response frame 700A, which a second playback device may transmit in response to receiving a probe request message (and perhaps also in response to determining that one or more conditions are met). Probe response frame 700B may conform to a specification, such as the IEEE 802.11 specification. While probe response frame 700B may conform to a specification, probe response frame 700B may also be modified for certain implementations. For instance, example probe response frames may include additional fields, or the fields of an IEEE 802.11 probe response frame may be re-purposed for this implementation.

As shown, within the MAC header, probe response frame 700B includes a frame control 702B and a duration 704B. Probe response frame 700B further includes a destination address (DA) 706B and source address (SA) 708B, which indicate the destination (e.g., the first playback device) and the source (e.g., the second playback device) of the probe response frame 700B, respectively. Probe response frame 700B further includes a basic service set (BSS) ID 710B. The BSS ID 710B may be set to the BSS of the particular local area network to which the second playback device is currently connected.

Within the frame body, probe request frame 700B includes parameters 712B. Parameters 712B may indicate the second network parameters of the local area network to which the second playback device has a valid connection. The first playback device may ultimately establish a valid connection by matching parameters 712B. Parameters 712B may include a time stamp (for synchronization), a beacon interval, capability info, and a SSID, among other examples.

Referring back to FIG. 6, in the example introduced above, playback device 604 may receive a response message from one or more of playback device 602 and playback device 606. For instance, if playback device 602 receive a probe request message from playback device 604 and determines that it is part of the same household as playback device 604 and has a valid network connection, then playback device 602 may responsively send a response message to playback device 604. The response message from playback device 602 may indicate second network parameters that playback device 602 is using to connect to the network (e.g., the WLAN created by access point 608).

e. Establish Valid Connection to Particular Network

Referring again to FIG. 5, at block 510, implementation 500 involves establishing a valid network connection to a particular network. For example, the first playback device may establish, via the wireless network interface, a valid network connection using the second network parameters in the response message received from the second playback device. The first playback device establishes the valid network connection to the same particular local area network as the first playback device. The particular local area network may be the first local area network that the first playback device previously was connected to using the first network parameters or a second local area network to which the second playback device is now connected. In some implementations, the first playback device attempts to establish the connection using the second network parameters in response to receiving the response message.

The first playback device may establish a valid network connection to a number of different types of networks. In some instances, the network connection is a network connection in station mode to an access point of the particular local area network. Alternatively, the network connection is a wireless network path to a wired network connection using an IP address assigned by an access point. Such a connection may be established when the particular local area network is a mesh point-to-point network between multiple playback devices of the media playback system. Other examples are possible as well.

Referring back to FIG. 6, in the example discussed previously, playback device 604 may establish a valid connection to the network using the second network parameters received from playback device 602. For instance, playback device 604 may establish a valid connection to the WLAN created by access point 608. Other examples are possible as well. For instance, playback device may establish a valid connection to a point-to-point mesh network, perhaps by connecting to playback device 602 (or playback device 606).

f. Join Media Playback System

Referring again to FIG. 5, at block 512, implementation 500 involves joining the media playback system. For example, the first playback device may join a media playback system that comprises the second playback device. By joining the media playback system, the first playback device may be controllable by control devices of the media playback system. Further, the first playback device may share state information (e.g., one or more state variables) with other playback devices of the media playback system and/or the control devices of the media playback system.

Further, joining the media playback system configures the first playback device to play back audio content using the established valid network connection to the particular local area network. For instance, the first playback device may retrieve audio content from one or more audio sources registered with the media playback system using the network connection. In addition, the first playback device may play back media content in synchrony with one or more second playback devices of the media playback system using the network connection. For example, the first playback device may receive audio content and/or playback timing information using the network connection.

Returning again to the example of FIG. 6, after establishing the network connection, playback device 604 may join the media playback system that includes playback device 602 (and possibly playback device 606). Playback device 604 may then share state information and perform joint operations, such as playback, with these playback devices. Further, any control devices connected to the playback system may now control playback device 604 over the established network connection.

As discussed herein, in example media playback systems, network parameters may be stored in respective files in data storage of each playback device of a media playback system. In some implementations, each file may have a version number also stored in the file. The version number may reflect a version of the network parameters stored in the file. Versioning the network parameters may facilitate use of the most-recent network parameters available in a media playback system.

For instance, after receiving network parameters, a playback device may compare a version number of the received network parameters with a version number of the network parameters stored in data storage. If the version number of the received network parameters is newer, the playback device may update (e.g., replace) the network parameters stored in the file with the received network parameters. For instance, after receiving the response message with the second network parameters in block 508, the first playback device may compare a version number of the second network parameters with a version number of the first network parameters. If the version number of the second network parameters is newer, then the first playback device may replace or otherwise update the file stored in data storage with the second network parameters. A version number may be newer when the version number is the greater number and/or if the version number is associated with a more recent time stamp. Upon replacing the network parameters in the file, the first playback device may use those network parameters in establishing a network connection (e.g., as described in block 510).

Moreover, in some implementations, a playback device may replicate the network parameters among other playback devices. For instance, a first playback device of a media playback system may determine the most recent network parameters of the media playback system. Such determining may involve receiving, via a network interface from multiple playback devices of the media playback system, messages indicating respective network parameters stored in files of respective data storages of multiple second playback devices. In some implementations, the first playback device receives such message in response to requesting network parameters from the second playback devices. Such messages may take the form of probe request and probe response frames, among other examples.

After receiving messages indicating the respective network parameters stored in files of respective data storages of the second playback devices, the first playback device may determine, based on respective version numbers of the network parameters indicated in each of the received messages, that particular network parameters having the latest version number or associated with a more recent timestamp are the most recent network parameters of the media playback system. For instance, the playback device may compare version numbers of network parameters in its network settings files against version numbers of received network parameters. In response to determining the most recent network parameters of the media playback system, the first playback device may update the network parameters in its stored file (if such network parameters are different). The first playback device may then establish a valid network connection using the updated network parameters.

Further, if one or more second playback devices sent lower-versioned network parameters, the first playback device may cause those playback devices to update their respective network parameters. For instance, the first playback device may update, via the network interface, at least one file stored in data storage of a second playback device with the most-recent network parameters. Such updating of the network parameters causes the second playback device to establish a valid network connection to the particular WLAN using the most-recent network parameters.

V. Example Implementation to Re-Establish Connectivity of Playback Device(s)

As indicated above, some example techniques may involve multiple playback devices. FIG. 8 shows example system 800 that includes playback device 802, playback device 804, and playback device 806. Under example techniques described herein (e.g., implementation 500), one or more of playback device 802, playback device 804, and playback device 806 may re-establish network connectivity using network parameters from another of playback device 802, playback device 804, or playback device 806.

As shown in FIG. 8, system 800 also includes an access point 808 that facilitates a local area network. Via an Ethernet (IEEE 802.3) or other wired network interface, playback device 802 is connected to access point 808. In addition, via a wireless (IEEE 802.11) network interface, playback device 802 forms the root of a point-to-point mesh network. Playback device 804 is configured to connect to access point 808 via a wireless point-to-point connection to playback device 802. Likewise, playback device 806 is configured to connect to access point 808 via a wireless point-to-point connection to playback device 804 (which is in turn configured to connect to playback device 802, as noted above).

The network parameters reflecting these network configurations of each playback device are stored in respective files in data storage of each playback device. In an example, while playback device 802 is powered off or otherwise unavailable, the wireless channel of playback devices 804 and 806 is updated from to a different channel (e.g., from channel 6 to channel 11). As a result, the network parameters in the file in data storage of playback device 802 indicate a different channel, and, as a result, playback device 802 attempts to establish the point-to-point connection to playback 804 on channel 6, while playback device 804 attempts to establish the point-to-point connection to playback 802 on channel 11. Because of this difference in wireless channel, playback device 804 and playback device 806 are unable to establish a network connection.

As described above in connection with implementation 500, in operation, an example playback device determines whether it is able to establish a valid connection (e.g., after retrieving network parameters from a file in data storage, perhaps after booting). In the example above, playback device 804 and playback device 806 may each determine whether they are able to establish a valid network connection. Given the difference in wireless channel described above, playback device 804 and playback device 806 may each determine that they are unable to establish a valid network connection. Playback device 804 and playback device 806 may make this determination using any suitable technique, such as the example techniques described above in connection with block 504 of FIG. 5.

Having determined that it is unable to establish a valid network connection, playback device 804 attempts to re-establish connectivity. In particular, playback device 804 broadcasts a probe request message (e.g., as described in block 506 of FIG. 5). In response to the probe request message, playback device 804 may receive a response with network parameters from playback device 802 (e.g., a response message as described in block 508 of FIG. 5). These network parameters indicate that playback device 802 is using channel 6.

Similarly, having determined that it is unable to establish a valid network connection, playback device 806 attempts to re-establish connectivity. In particular, playback device 806 broadcasts a probe request message (e.g., as described in block 506 of FIG. 5). However, unlike playback device 804, playback device 806 is not in wireless range of playback device 802. As such, playback device 806 does not receive a response from playback device 802 to the probe request message broadcasted by playback device 806. Playback device 806 also does not receive a probe request message with network parameters from playback device 804, as playback device 804 does not have a network connection (i.e., playback device 804 is lost).

On the other hand, having received a response with network parameters from playback device 802, playback device 804 uses those network parameters in an attempt to re-establish connectivity. In particular, playback device 804 switches to channel 6, which is the wireless channel represented in the response message from playback device 802 (and in use by playback device 802). Playback device 804 then obtains an IP address and establishes a valid network connection to access point 808 via playback device 802.

However, as noted above, playback device 804 and 806 were updated to wireless channel 11 after playback device 802 was set to channel 6. As such, a version number of the network parameters stored in the file on playback device 804 is newer than a version number of the network parameters stored in the file on playback device 802. Accordingly, when playback device 802 and playback device 804 establish a connection, playback device 802 may receive network parameters from playback device 804 and determine that these network parameters are more recent than its own stored network parameters. As a result, playback device 802 may update its own network parameters with the network parameters from playback device 804. This causes playback device 802 to use wireless channel 11.

When playback device 802 switches to wireless channel 11, playback device 804 may lose its network connection to playback device 802, as playback device 804 is now using wireless channel 6. Having lost the network connection to playback device 802, playback device 804 may repeatedly attempt to connect to playback device 802 over a window of time. If those attempts to connect fail, playback device 804 may again determine that it is unable to establish a valid network connection.

In response to determining that it is unable to establish a valid network connection, playback device 804 broadcasts another probe request message. In response to the probe request message, playback device 804 may receive a response with network parameters from playback device 802. These network parameters indicate that playback device 802 is using channel 11. Playback device 804 uses those network parameters in an attempt to re-establish connectivity. In particular, playback device 804 switches to channel 11, which is the wireless channel represented in the response message from playback device 802. Playback device 804 then obtains an IP address and re-establishes a valid network connection to access point 808 via playback device 802.

Once playback device 804 is using channel 11, playback device 806 may establish a network connection to playback device 804 (as playback device 806 is still on channel 11). This allows playback device 806 to establish a valid network connection via playback device 804 (and playback device 802) to access point 808. At this point, playback devices 802, 804, and 806 all have established network connections using the most recent network parameters available in the media playback system.

If instead of channel 11, the network parameters stored on playback device 806 directed playback device 806 to use channel 1, then playback device 806 would have broadcasted another probe request message. Playback device 804 would have sent a response to the probe request message indicating that it was using channel 11. Playback device 806 would then have switched to channel 11.

Further, if the version number of the network parameters stored in playback device 806 were newer than the respective version numbers of network parameters stored in playback device 802 and 804, these network parameters would be replicated to playback device 804 (and ultimately 802) using the techniques described above.

VI. Example Techniques to Establish Connectivity to a New Access Point

Figure 9:
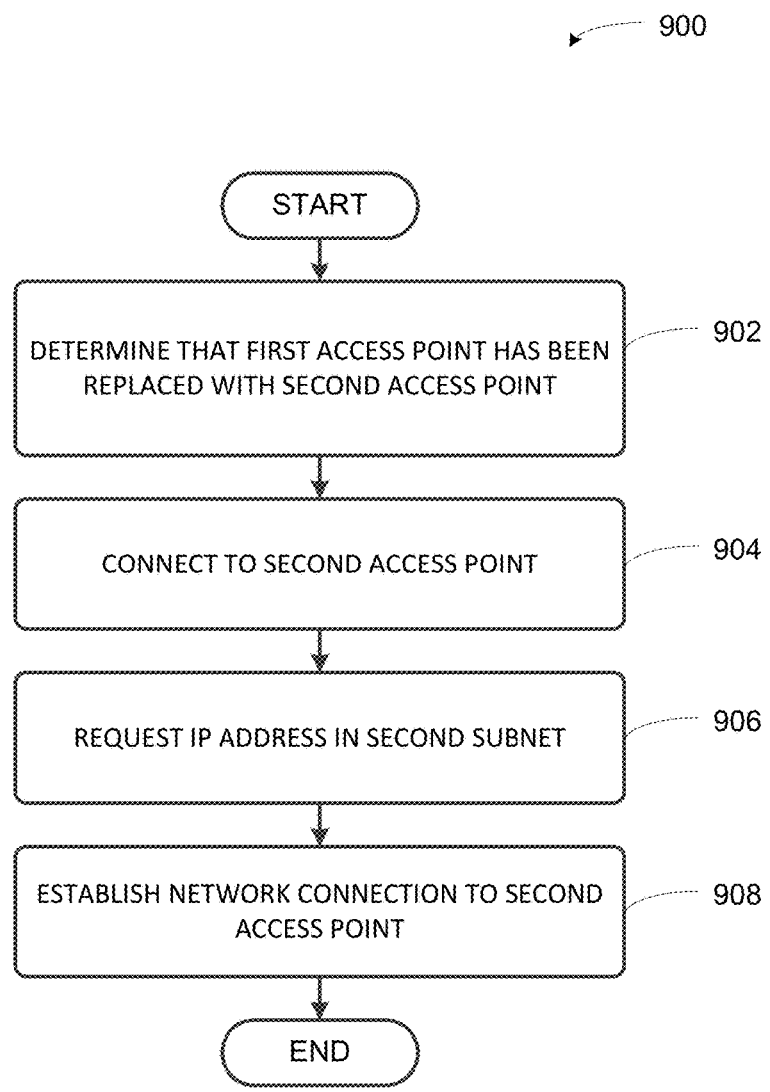
FIG. 9 shows an example flow diagram to re-establish network connectivity of a playback device.

As indicated above, some example techniques may involve a playback device re-establishing network connectivity. Since example playback devices stored their network settings in respective files in data storage, when an access point is replaced, playback devices that were wirelessly connected to the original access point will not immediately update their IP address. Instead, such playback devices may retain their network parameters until the next DHCP renew (which may be a lease that is days or weeks long). As a result, the playback devices that were wirelessly connected to the original access point will lose network connectivity. FIG. 9 presents an implementation 900 to facilitate re-establishing network connectivity when an access point (e.g., a wireless router) is replaced.

a. Determine that First Access Point has been Replaced with Second Access Point

At block 902, implementation 900 involves determining that a first access point has been replaced with a second access point. For instance, a playback device that is configured to connect to a first access point by way of a wireless network connection (e.g., via network parameters stored on the playback device) may determine that the first access point has been replaced with a second access point. In some cases, the first access point and the second access point are different physical devices that assign IP addresses in different subnets. For instance, the first access point assign IP addresses in the 192.168.x.y subnet while the second access point assigns IP addresses in the 10.10.x.y subnet. Alternatively, the first access point and the second access point are the same physical device that has been reconfigured to lease IP addresses in a different subnet.

To illustrate, FIG. 10 shows example system 1000 that includes playback device 1002, playback device 1004, playback device 1006, and playback device 1008. As shown in FIG. 10, system 1000 also includes an access point 1010 that facilitates a local area network. Via an Ethernet (IEEE 802.3) or other wired network interface, playback device 1002 is connected to access point 1010. In addition, via a wireless (IEEE 802.11) network interface, playback device 1002 forms the root of a point-to-point mesh network. Playback device 1004 is configured to connect to access point 1010 via a wireless point-to-point connection to playback device 1002. Likewise, playback device 1006 is configured to connect to access point 1010 via a wireless point-to-point connection to playback device 1004 (which is in turn configured to connect to playback device 1002, as noted above). Playback device 1008 is also configured to connect to access point 1010 via a wireless point-to-point connection to playback device 1002. A network device (e.g., a set-top box, smart television, or any other network device) is connected to playback device 1008 via a wired Ethernet connection. This allows network device 1012 to obtain a connection to access point 1010 (via playback device 1008 and 1002).

However, when access point 1010 is updated to assign IP addresses in a different subnet (or replaced with a new access point that assigns IP addresses in a second subnet), then playback device 1002 receives an IP address in this second subnet by way of its wired Ethernet connection to access point 1010. However, since playback device 1004, playback device 1006, and playback device 1008 are configured to use IP addresses in the original (first) subnet, these playback devices lose their network connection to playback device 1002. Further, these playback devices might not obtain an IP address in the second subnet immediately (e.g., until their DHCP leases expire, which might be a significant period of time, such as 24 hours or more). During this time, playback device 1004, playback device 1006, and playback device 1008 would be lost.

Further, because of its wired connection to network device 1012, playback device 1008 may broadcast that it has a wired connection. In response, playback device 1004 and playback device 1006 may attempt to establish a valid network connection by connecting to playback device 1008 via respective mesh point-to-point connections. However, because network device 1012 is not an access point, such connections would not allow playback device 1004 and playback device 1006 (or playback device 1008) to establish a valid network connection.

Re-establishing network connectivity when access point 1010 is replaced may involve one or more of playback device 1004, playback device 1006, and playback device 1008 determining that access point 1010 has been replaced or re-configured to assign IP addresses in a different subnet. After recognizing this condition, one or more of playback device 1004, playback device 1006, and playback device 1008 may ultimately connect to the new IP, obtain an IP address in the new subnet, and re-establish a valid network connection.

Determining that the first access point has been replaced with a second playback device may involve monitoring DHCP frames. DHCP clients (e.g., playback devices) may initiate a DHCP connection by broadcasting a DHCP discovery message. When a DHCP server (e.g., an access point) receives a DHCP discover message (which is, in effect, an IP address lease request), the server reserves an IP address for the client and makes a lease offer by sending a DHCP offer message to the client. The client responds to the DHCP offer message by broadcasting a DHCP request, which requests the offered address.

In example implementations, an example playback device may monitor, within DHCP request frames received via a network interface (e.g., via a wireless network interface), for particular DHCP request frames that have a portion of the DHCP request frame set to a DHCP server ID. DHCP request frames are broadcasted, which allows the playback device to receive them. Moreover, DHCP request frames include a field containing the DHCP server ID (e.g., an IP address of the DHCP server). Upon receiving a DHCP request frame, the playback device may determine whether the DHCP server ID is set, and whether the DHCP server ID in the received DHCP request frame is different from the DHCP server ID stored in the file on data storage. If the DHCP server ID in the received DHCP request frame is different from the DHCP server ID stored in the file on data storage, the playback device may determine that the DHCP server (i.e., the access point) has changed (i.e., been replaced or reconfigured).

b. Connect to Second Access Point

Referring back to FIG. 9, at block 904, implementation 900 involves connecting to the second access point. For instance, the playback device may attempt to connect to the second access point in response to determining that the first access point has been replaced with the second access point. Attempting to connect to the second access point may involve the playback device broadcasting a DHCP discovery message. As noted above, broadcasting such a DHCP discovery message initiates the DHCP connection process, which ultimately leads to the playback device obtaining a new IP address.

For instance, referring back to FIG. 10, in response to determining that access point 1010 has been replaced (or reconfigured), one or more of playback device 1004, playback device 1006, and/or playback device 1008 may attempt to connect to the new access point. For instance, playback device 1004 may broadcast a DHCP discovery message, which may be received by the new access point. The new access point may then continue with the DHCP connection process.

c. Request IP Address in Second Subnet

In FIG. 9, at block 906, implementation 900 involves requesting an IP address in the second subnet. For instance, the playback device may broadcast a DHCP request message in response to receiving a DHCP offer message from the second access point. The DHCP offer message contains fields indicating the client's MAC address, the offered IP address, the subnet mask, the lease duration, and the IP address of the DHCP server making the offer.

For instance, referring again to FIG. 10, one or more of playback device 1004, playback device 1006, and/or playback device 1008 request an IP address in the subnet of the local area network provided by the second access point. For instance, playback device 1004 may broadcast a DHCP request message, which may be received by the new access point. The new access point may then continue with the DHCP connection process.

In some cases, multiple DHCP servers may be on the same subnet. To identify this condition, the playback device may determine that an estimated network of the playback device as provided by the second access point is different than a current network of the playback device as provided by the first access point. For instance, to determine the current network of the playback device, the playback device may perform an AND operation between the current IP address of the playback device and the subnet mask, which are both stored in the network settings file in data storage. Then, to determine the estimated network of the playback device, the playback device may perform an AND operation between the current new IP address of the playback device (i.e., the IP address in the second subnet) and the subnet mask. The playback device may then compare the estimated network of the third playback device to the current network of the third playback device to determine whether there are two DHCP servers on the same subnet. If so, the playback device may renew its IP address or take other action to connect to the desired DHCP server.

d. Establish Network Connection to Second Access Point

Referring again to FIG. 9, at block 908, implementation 900 involves establishing a network connection to the second access point. For instance, the playback device may receive a DHCP acknowledgment from the DHCP server. The DHCP acknowledgment includes further configuration information for the playback device to use to configure its network interface for communication on the local area network provided by the DHCP server.

For instance, referring back to FIG. 10, in response to determining that access point 1010 has been replaced (or reconfigured), one or more of playback device 1004, playback device 1006, and/or playback device 1008 may attempt to establish a network connection to the new access point. For instance, playback device 1004 may receive a DHCP acknowledgement from the DHCP server and configure its network interface to use the network parameters indicate in the received message(s). Playback device 1004 may store these network parameters in the network settings file in data storage.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

(Feature 1) A method comprising accessing, from a file stored in data storage of the first playback device, first network parameters comprising: (i) a service set identifier (SSID) identifying a first wireless local area network (WLAN); (ii) a wireless channel; (iii) an IP address for the network interface, wherein the first playback device previously established a valid network connection over the first WLAN using the first network parameters; determining that the first playback device is unable to establish a valid network connection to the first WLAN using the first network parameters, wherein determining that the first playback device is unable to establish a valid network connection to the first WLAN comprises attempting to connect to the first WLAN via the wireless network interface using the first network parameters; in response to determining that the first playback device is unable to establish the valid network connection to the first WLAN, broadcasting, via the network interface, a probe request message over multiple wireless channels; receiving, via a wireless network interface from a second playback device, a response to the probe request message, the response to the probe request message indicating second network parameters that are assigned to a network interface of the second playback device to establish a valid network connection to a particular WLAN, wherein the particular WLAN is one of: (a) the first WLAN or (b) a second WLAN, and wherein the second wireless parameters comprise a wireless channel of the particular WLAN; establishing, via the wireless network interface, a valid network connection to the particular WLAN using the second network parameters; and joining, via the established valid network connection to the particular WLAN, a media playback system that comprises the second playback device, wherein the first playback device is configured to play back audio content using the established valid connection to the particular WLAN.

(Feature 2) The method of feature 1, further comprising: after establishing the valid network connection to the particular WLAN using the second network parameters: determining most recent network parameters of the media playback system, wherein determining the most recent network parameters of the media playback system comprises: receiving, via the network interface from multiple playback devices of the media playback system, messages indicating respective network parameters stored in files of respective data storages of the multiple playback devices; and determining, based on respective version numbers of the network parameters indicated in each of the received messages, that particular network parameters having the latest version number are the most recent network parameters of the media playback system; and in response to determining the most recent network parameters of the media playback system and if the particular network parameters are different from the second network parameters, establishing, via the wireless network interface, a valid network connection to the particular WLAN using the particular network parameters having the latest version number.

(Feature 3) The method of feature 2, wherein the second network parameters are determined as the most recent network parameters of the media playback system, and wherein the operations further comprise updating, via the network interface, at least one file stored in data storage of at least one additional playback device with the second network parameters, wherein updating the at least one file stored in data storage of at least one additional playback device with the second network parameters causes the at least one additional playback device to establish a valid network connection to the particular WLAN using the second network parameters.

(Feature 4) The method of feature 1, wherein determining that the first playback device is unable to establish the valid network connection to the first WLAN comprises repeatedly attempting to connect to the first WLAN via the wireless network interface using the first network settings over a window of time, wherein the window of time lasts at least thirty seconds.

(Feature 5) The method of feature 1, wherein determining that the first playback device is unable to establish the valid network connection to the first WLAN comprises determining that the first playback device is unable to establish the valid network connection via one of: (a) a network connection in station mode to an access point of the first WLAN; (b) a network path to a wired network connection using an IP address assigned by an access point; or (c) a network connection to a control device configured to control playback of audio content by the first playback device, the network connection using an IP address automatically assigned by the first playback device.

(Feature 6) The method of feature 5, wherein the first WLAN comprises a mesh point-to-point network between multiple playback devices of the media playback system.

(Feature 7) The method of feature 1, wherein establishing the valid network connection to the particular WLAN using the second network parameters comprises one of: (a) a network connection in station mode to an access point of the particular WLAN or (b) a network path to a wired network connection using an IP address assigned by an access point, wherein the particular WLAN comprises a mesh point-to-point network between multiple playback devices of the media playback system.

(Feature 8) A tangible, non-transitory computer-readable medium having stored therein instructions executable by one or more processors to cause a device to perform the method of any of features 1-7.

(Feature 9) A device configured to perform the method of any of features 1-7.

(Feature 10) A media playback system configured to perform the method of any of features 1-7.

(Feature 11) A method to be performed in media playback system comprising a first playback device connected via a wired connection to an access point and a second playback device configured to connect to the access point via a wireless point-to-point connection to the first playback device, the method comprising: determining that the second playback device is unable to establish a valid network connection to the access point via the wireless point-to-point connection to the first playback device using first network parameters; in response to determining that the second playback device is unable to establish the valid network connection to the access point, broadcasting, via a network interface of the second playback device, a probe request message over multiple wireless channels; receiving, via the wireless network interface from the first playback device, a response to the probe request message, the response to the probe request message indicating second network parameters assigned to a network interface of the first playback device, wherein the second network parameters are different from the first network parameters; and establishing, via the wireless network interface, a valid network connection to the access point via the wireless point-to-point connection to the first playback device using the second network parameters.

(Feature 12) The method of feature 11, further comprising after establishing the valid network connection to the access point using the second network parameters, determining that the second playback device is unable to establish a valid network connection to the access point via the wireless point-to-point connection to the first playback device using the second network parameters; in response to determining that the second playback device is unable to establish the valid network connection to the access point, broadcasting, via a network interface of the second playback device, another probe request message over multiple wireless channels; receiving, via the wireless network interface from the first playback device, a response to the probe request message, the response to the another probe request message indicating the first network parameters; and establishing, via the wireless network interface, a valid network connection to the access point via the wireless point-to-point connection to the first playback device using the first network parameters.

(Feature 13) The method of feature 12, after the second playback device establishes the valid network connection to the access point via the wireless point-to-point connection to the first playback device using the second network parameters, determining that the first network parameters are a newer revision than the second network parameters; and in response to determining that the first network parameters are a newer revision than the second network parameters, assigning the first network parameters to the network interface of the first playback device, wherein assigning the first network parameters to the network interface of the first playback device prevents the second playback device from establishing the valid network connection via the wireless point-to-point connection to the first playback device to the access point using the second network parameters on the basis that the first and second network parameters are different.

(Feature 14) The method of feature 13, further comprising receiving, via a network interface of the first playback device, the second network parameters from the second playback device, wherein the second network parameters are represented in a file stored in data storage of the second playback device; and wherein assigning the first network parameters to the network interface of the first playback device comprises updating network parameters represented a file stored in data storage of the first playback device from the second network parameters to the first network parameters.

(Feature 15) The method of feature 12, further comprising determining that the third playback device is unable to establish a valid network connection to the access point via a wireless point-to-point connection to the second playback device using the first network parameters; in response to determining that the third playback device is unable to establish the valid network connection to the access point, broadcasting, via a network interface of the third playback device, a probe request message over multiple wireless channels; receiving, via the wireless network interface from the second playback device, a response to the probe request message, the response to the probe request message indicating the first network parameters; and after receiving the response to the probe request and after the second playback establishes the valid network connection to the access point via the wireless point-to-point connection to the first playback device using the first network parameters, establishing, via the wireless network interface, a valid network connection to the access point via a wireless point-to-point connection to the second playback device using the first network parameters.

(Feature 16) A tangible, non-transitory computer-readable medium having stored therein instructions executable by one or more processors to cause one or more devices to perform the method of any of features 11-15.

(Feature 17) A device configured to perform the method of any of features 11-15.

(Feature 18) A media playback system configured to perform the method of any of features 11-15.

(Feature 19) A method to be performed in a media playback system comprising a first playback device connected via a wired connection to an access point and a second playback device configured to connect to the access point via a wireless point-to-point connection to the first playback device, the method comprising determining that the second playback device is unable to establish a valid network connection to the access point via the wireless point-to-point connection to the first playback device using first network parameters; in response to determining that the second playback device is unable to establish the valid network connection to the access point, broadcasting, via the network interface, a probe request message over multiple wireless channels; receiving, via the wireless network interface from the first playback device, a response to the probe request message, the response to the probe request message indicating second network parameters that assigned to a network interface of the first playback device, wherein the second network parameters are different from the first network parameters; and establishing, via the wireless network interface, a valid network connection to the access point via the wireless point-to-point connection to the first playback device using the second network parameters.

(Feature 20) The method of feature 19, further comprising after establishing the valid network connection to the access point using the second network parameters, determining that the second playback device is unable to establish a valid network connection to the access point via the wireless point-to-point connection to the first playback device using the second network parameters; in response to determining that the second playback device is unable to establish the valid network connection to the access point, broadcasting, via a network interface of the second playback device, another probe request message over multiple wireless channels; receiving, via the wireless network interface from the first playback device, a response to the probe request message, the response to the another probe request message indicating the first network parameters; and establishing, via the wireless network interface, a valid network connection to the access point via the wireless point-to-point connection to the first playback device using the first network parameters.

(Feature 21) The method of feature 20, further comprising after establishing the valid network connection to the access point via the wireless point-to-point connection to the first playback device using the second network parameters, transmitting, via the network interface, the first network parameters to the first playback device, and wherein transmitting the first network parameters to the first playback device causes the first playback device to assign the first network parameters to a network interface of the first playback device on the basis that the first network parameters are a newer revision than the second network parameters.

(Feature 22) The method of feature 20, wherein establishing the valid network connection to the access point via the wireless point-to-point connection to the first playback device using the second network parameters comprises updating network parameters represented a file stored in data storage of the second playback device from the first network parameters to the second network parameters, and wherein establishing the valid network connection to the access point via the wireless point-to-point connection to the first playback device using the first network parameters comprises updating network parameters represented a file stored in data storage of the second playback device from the second network parameters to the first network parameters (Feature 23) The method of feature 19, further comprising before establishing the valid network connection to the access point via the wireless point-to-point connection to the first playback device using the second network parameters: receiving, via the network interface from the third playback device, a probe request message; and in response to receiving the probe request message from the third playback device, transmitting, via the wireless network interface to the third playback device, a response to the probe request message, the response to the probe request message indicating the first network parameters, wherein transmitting the response to the probe request message causes the third playback device to attempt to establish, a valid network connection to the access point via a wireless point-to-point connection to the second playback device using the first network parameters.

(Feature 24) A tangible, non-transitory computer-readable medium having stored therein instructions executable by one or more processors to cause one or more devices to perform the method of any of features 19-23.

(Feature 25) A device configured to perform the method of any of features 19-23.

(Feature 26) A media playback system configured to perform the method of any of features 19-23.

(Feature 27) A method comprising determining that the first access point has been replaced with a second access point, wherein the second access point is configured to assign IP addresses in a second subnet that covers a different IP address range than the first subnet; in response to determining that the first access point has been replaced with the second access point, connecting, via a network interface, to the second access point; after connecting to the second access point, requesting, via the network interface, an IP address in the second subnet; and establishing, via the network interface, a network connection to the second access point via a wireless point-to-point connection to the first playback device using the IP address in the second subnet.

(Feature 28) The method of feature 27, wherein a first DHCP server IP address of the first access point is stored in a file on data storage, wherein determining that the first access point has been replaced with the second access point comprises: monitoring, within DHCP request frames received via the network interface, for particular DHCP request frames that have a portion of the DHCP request frame set to a second DHCP server IP address; and determining that the second DHCP server IP address set in the particular DHCP request frames is different from the first DHCP server IP address stored in the file on data storage, wherein the file represents network parameters including the DHCP server IP address.

(Feature 29) The method of feature 27, wherein determining that the first access point has been replaced with the second access point further comprises determining that an estimated network as provided by the second access point is different than a current network as provided by the first access point.

(Feature 30) The method of feature 29, wherein determining that the estimated network as provided by the second access point is different than the current network as provided by the first access point comprises: determining the current network; determining an estimated network; and comparing the estimated network to the current network.

(Feature 31) The method of feature 27, wherein requesting the IP address in the second subnet comprises: broadcasting a DHCP discovery message to initiate a new wireless point-to-point connection with the second access point having the first DHCP server IP address.

(Feature 32) The method of feature 27, wherein requesting the IP address in the second subnet comprises: determining that a lease of the IP address in the first subnet has expired; and in response to determining that the lease of the IP address in the first subnet has expired, renewing an IP address lease with the first access point having the first DHCP server IP address.

(Feature 33) A tangible, non-transitory computer-readable medium having stored therein instructions executable by one or more processors to cause one or more devices to perform the method of any of features 27-32.

(Feature 34) A device configured to perform the method of any of features 27-32.

(Feature 35) A media playback system configured to perform the method of any of features 27-32.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A first playback device comprising:
a wireless network interface;
one or more processors;
tangible, non-transitory, computer-readable media having stored therein instructions executable by the one or more processors to cause the first playback device to perform operations comprising:
accessing, from a file stored in data storage of the first playback device, first network parameters comprising: (i) a service set identifier (SSID) identifying a first wireless local area network (WLAN); (ii) a wireless channel; (iii) an IP address for the network interface, wherein the first playback device previously established a valid network connection over the first WLAN using the first network parameters;
determining that the first playback device is unable to establish a valid network connection to the first WLAN using the first network parameters, wherein determining that the first playback device is unable to establish a valid network connection to the first WLAN comprises attempting to connect to the first WLAN via the wireless network interface using the first network parameters;
in response to determining that the first playback device is unable to establish the valid network connection to the first WLAN, broadcasting, via the network interface, a probe request message over multiple wireless channels;
receiving, via the wireless network interface from a second playback device, a response to the probe request message, the response to the probe request message indicating second network parameters that are assigned to a network interface of the second playback device to establish a valid network connection to a particular WLAN, wherein the particular WLAN is one of: (a) the first WLAN or (b) a second WLAN, and wherein the second wireless parameters comprise a wireless channel of the particular WLAN;
establishing, via the wireless network interface, a valid network connection to the particular WLAN using the second network parameters; and
joining, via the established valid network connection to the particular WLAN, a media playback system that comprises the second playback device, wherein the first playback device is configured to play back audio content using the established valid connection to the particular WLAN.

2. The first playback device of claim 1, wherein the operations further comprise:

after establishing the valid network connection to the particular WLAN using the second network parameters:
determining most recent network parameters of the media playback system, wherein determining the most recent network parameters of the media playback system comprises:
receiving, via the network interface from multiple playback devices of the media playback system, messages indicating respective network parameters stored in files of respective data storages of the multiple playback devices; and
determining, based on respective version numbers of the network parameters indicated in each of the received messages, that particular network parameters having the latest version number are the most recent network parameters of the media playback system; and
in response to determining the most recent network parameters of the media playback system and if the particular network parameters are different from the second network parameters, establishing, via the wireless network interface, a valid network connection to the particular WLAN using the particular network parameters having the latest version number.

3. The first playback device of claim 2, wherein the second network parameters are determined as the most recent network parameters of the media playback system, and wherein the operations further comprise updating, via the network interface, at least one file stored in data storage of at least one additional playback device with the second network parameters, wherein updating the at least one file stored in data storage of at least one additional playback device with the second network parameters causes the at least one additional playback device to establish a valid network connection to the particular WLAN using the second network parameters.

4. The first playback device of claim 1, wherein determining that the first playback device is unable to establish the valid network connection to the first WLAN comprises repeatedly attempting to connect to the first WLAN via the wireless network interface using the first network settings over a window of time, wherein the window of time lasts at least thirty seconds.

5. The first playback device of claim 1, wherein determining that the first playback device is unable to establish the valid network connection to the first WLAN comprises determining that the first playback device is unable to establish the valid network connection via one of: (a) a network connection in station mode to an access point of the first WLAN; (b) a network path to a wired network connection using an IP address assigned by an access point; or (c) a network connection to a control device configured to control playback of audio content by the first playback device, the network connection using an IP address automatically assigned by the first playback device.

6. The first playback device of claim 5, wherein the first WLAN comprises a mesh point-to-point network between multiple playback devices of the media playback system.

7. The first playback device of claim 1, wherein establishing the valid network connection to the particular WLAN using the second network parameters comprises one of: (a) a network connection in station mode to an access point of the particular WLAN or (b) a network path to a wired network connection using an IP address assigned by an access point, wherein the particular WLAN comprises a mesh point-to-point network between multiple playback devices of the media playback system.

8. A tangible, non-transitory, computer-readable media having stored therein instructions executable by one or more processors to cause a first playback device to perform operations comprising:
   accessing, from a file stored in data storage of the first playback device, first network parameters comprising: (i) a service set identifier (SSID) identifying a first wireless local area network (WLAN); (ii) a wireless channel; (iii) an IP address for the network interface, wherein the first playback device previously established a valid network connection over the first WLAN using the first network parameters;
   determining that the first playback device is unable to establish a valid network connection to the first WLAN using the first network parameters, wherein determining that the first playback device is unable to establish a valid network connection to the first WLAN comprises attempting to connect to the first WLAN via the wireless network interface using the first network parameters;
   in response to determining that the first playback device is unable to establish the valid network connection to the first WLAN, broadcasting, via a network interface, a probe request message over multiple wireless channels;
   receiving, via the wireless network interface from a second playback device, a response to the probe request message, the response to the probe request message indicating second network parameters that are assigned to a network interface of the second playback device to establish a valid network connection to a particular WLAN, wherein the particular WLAN is one of: (a) the first WLAN or (b) a second WLAN, and wherein the second wireless parameters comprise a wireless channel of the particular WLAN;
   establishing, via the wireless network interface, a valid network connection to the particular WLAN using the second network parameters; and
   joining, via the established valid network connection to the particular WLAN, a media playback system that comprises the second playback device, wherein the first playback device is configured to play back audio content using the established valid connection to the particular WLAN.

9. The first playback device of claim 8, wherein the operations further comprise:
   after establishing the valid network connection to the particular WLAN using the second network parameters:
      determining most recent network parameters of the media playback system, wherein determining the most recent network parameters of the media playback system comprises:
         receiving, via the network interface from multiple playback devices of the media playback system, messages indicating respective network parameters stored in files of respective data storages of the multiple playback devices; and
         determining, based on respective version numbers of the network parameters indicated in each of the received messages, that particular network parameters having the latest version number are the most recent network parameters of the media playback system; and
      in response to determining the most recent network parameters of the media playback system and if the particular network parameters are different from the second network parameters, establishing, via the wireless network interface, a valid network connection to the particular WLAN using the particular network parameters having the latest version number.

10. The tangible, non-transitory computer-readable medium of claim 9, wherein the second network parameters are determined as the most recent network parameters of the media playback system, and wherein the operations further comprise updating, via the network interface, at least one file stored in data storage of at least one additional playback device with the second network parameters, wherein updating the at least one file stored in data storage of at least one additional playback device with the second network parameters causes the at least one additional playback device to establish a valid network connection to the particular WLAN using the second network parameters.

11. The tangible, non-transitory computer-readable medium of claim 8, wherein determining that the first playback device is unable to establish the valid network connection to the first WLAN comprises repeatedly attempting to connect to the first WLAN via the wireless network interface using the first network settings over a window of time, wherein the window of time lasts at least thirty seconds.

12. The tangible, non-transitory computer-readable medium of claim 8, wherein determining that the first playback device is unable to establish the valid network connection to the first WLAN comprises determining that the first playback device is unable to establish the valid network connection via one of: (a) a network connection in station mode to an access point of the first WLAN; (b) a network path to a wired network connection using an IP address assigned by an access point; or (c) a network connection to a control device configured to control playback of audio content by the first playback device, the network connection using an IP address automatically assigned by the first playback device.

13. The tangible, non-transitory computer-readable medium of claim 12, wherein the first WLAN comprises a mesh point-to-point network between multiple playback devices of the media playback system.

14. The tangible, non-transitory computer-readable medium of claim 8, wherein establishing the valid network connection to the particular WLAN using the second network parameters comprises one of: (a) a network connection in station mode to an access point of the particular WLAN or (b) a network path to a wired network connection using an IP address assigned by an access point, wherein the particular WLAN comprises a mesh point-to-point network between multiple playback devices of the media playback system.

15. A method comprising
   accessing, via a first playback device from a file stored in data storage of the first playback device, first network parameters comprising: (i) a service set identifier (SSID) identifying a first wireless local area network (WLAN); (ii) a wireless channel; (iii) an IP address for the network interface, wherein the first playback device previously established a valid network connection over the first WLAN using the first network parameters;
   determining, via a first playback device, that the first playback device is unable to establish a valid network connection to the first WLAN using the first network parameters, wherein determining that the first playback device is unable to establish a valid network connection to the first WLAN comprises attempting to connect to the first WLAN via the wireless network interface using the first network parameters;

in response to determining that the first playback device is unable to establish the valid network connection to the first WLAN, broadcasting, via a network interface of the first playback device, a probe request message over multiple wireless channels;

receiving, via the wireless network interface of the first playback device from a second playback device, a response to the probe request message, the response to the probe request message indicating second network parameters that are assigned to a network interface of the second playback device to establish a valid network connection to a particular WLAN, wherein the particular WLAN is one of: (a) the first WLAN or (b) a second WLAN, and wherein the second wireless parameters comprise a wireless channel of the particular WLAN;

establishing, via the wireless network interface of the first playback device, a valid network connection to the particular WLAN using the second network parameters; and joining, via the established valid network connection to the particular WLAN, a media playback system that comprises the second playback device, wherein the first playback device is configured to play back audio content using the established valid connection to the particular WLAN.

16. The method of claim 15, further comprising:
after establishing the valid network connection to the particular WLAN using the second network parameters:
  determining most recent network parameters of the media playback system, wherein determining the most recent network parameters of the media playback system comprises:
    receiving, via the network interface from multiple playback devices of the media playback system, messages indicating respective network parameters stored in files of respective data storages of the multiple playback devices; and
    determining, based on respective version numbers of the network parameters indicated in each of the received messages, that particular network parameters having the latest version number are the most recent network parameters of the media playback system; and
  in response to determining the most recent network parameters of the media playback system and if the particular network parameters are different from the second network parameters, establishing, via the wireless network interface, a valid network connection to the particular WLAN using the particular network parameters having the latest version number.

17. The method of claim 16, wherein the second network parameters are determined as the most recent network parameters of the media playback system, and wherein the operations further comprise updating, via the network interface, at least one file stored in data storage of at least one additional playback device with the second network parameters, wherein updating the at least one file stored in data storage of at least one additional playback device with the second network parameters causes the at least one additional playback device to establish a valid network connection to the particular WLAN using the second network parameters.

18. The method of claim 15, wherein determining that the first playback device is unable to establish the valid network connection to the first WLAN comprises repeatedly attempting to connect to the first WLAN via the wireless network interface using the first network settings over a window of time, wherein the window of time lasts at least thirty seconds.

19. The method of claim 15, wherein determining that the first playback device is unable to establish the valid network connection to the first WLAN comprises determining that the first playback device is unable to establish the valid network connection via one of: (a) a network connection in station mode to an access point of the first WLAN; (b) a network path to a wired network connection using an IP address assigned by an access point; or (c) a network connection to a control device configured to control playback of audio content by the first playback device, the network connection using an IP address automatically assigned by the first playback device.

20. The method of claim 15, wherein establishing the valid network connection to the particular WLAN using the second network parameters comprises one of: (a) a network connection in station mode to an access point of the particular WLAN or (b) a network path to a wired network connection using an IP address assigned by an access point, wherein the particular WLAN comprises a mesh point-to-point network between multiple playback devices of the media playback system.

* * * * *